United States Patent Office 3,470,177
Patented Sept. 30, 1969

3,470,177
HEXAHYDROTRIAZINE DERIVATIVE
Rolf Zimmermann, Wiesbaden-Biebrich, Germany, assignor to Chemische Werke Albert, Wiesbaden-Biebrich, Germany, a corporation of Germany
No Drawing. Original application July 13, 1965, Ser. No. 471,745, now Patent No. 3,361,847, dated Jan. 2, 1968. Divided and this application Oct. 27, 1967, Ser. No. 678,759
Claims priority, application Germany, May 19, 1965, C 35,881; June 18, 1965, C 36,145
Int. Cl. C07d 55/14
U.S. Cl. 260—248    3 Claims

ABSTRACT OF THE DISCLOSURE

A flame-retardant hexahydrotriazine derivative of the formula

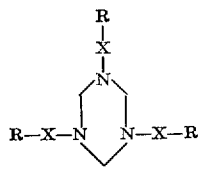

(I)

in which X is >C=O or >SO$_2$ and at least one of the radicals R is the group

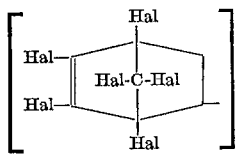

(II)

Hal being a halogen having an atomic weight of at least 35 and at most 80 and the other radicals R being the group —CH=CH$_2$.

---

This application is a divisional application of co-pending commonly assigned United States patent application Ser. No. 471,745, filed July 13, 1965, now U.S. Patent No. 3,361,847.

This invention is concerned with a hexahydrotriazine derivative.

An object of the invention is a hexahydrotriazine derivative of the formula

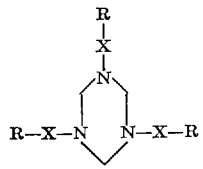

(I)

in which X is >C=O or >SO$_2$ and at least one of the radicals R is the group (II)

Hal being a halogen having an atomic weight of at least 35 and at most 80 and the other radicals R being the group —CH=CH$_2$. In these derivatives suitably at least two of the radicals R represent the group (II). In this group the halogen may be bromine or preferably chlorine.

The compounds of the invention are suitable as fire-retardant additives in heat-curable fire-retardant moulding compositions comprising an unsaturated polyester and/or polyether acetal, a vinyl monomer copolymerisable therewith, a polymerisation catalyst, active at elevated temperature, a filler and the compounds of the invention as a fire-retardant additive, if desired, together with at least 2% by weight of perchloropentacyclo-(5,2,1,0$^{2,6}$,0$^{3,9}$,0$^{5,8}$)-decane or 1,3,5-s-tris-(dihalopropionyl)-hexahydrotriazine. In such compositions the compounds of the invention generally are present in an amount of at least 0.2% by weight. The fire-retardant additives or the mixtures thereof are present in an amount of not more than 30% by weight and the percentages are based on the combined weight of the polyester, the polyether acetal and the monomer.

Preferably the amount of fire-retardant additive of the invention is between 2 to 15% by weight. The optimum amount is, however, dependent on the nature of the composition. The use of mixtures of the above-mentioned various types of compounds is especially preferred. As a result of the high melting point of the additive (the compound recited in Example 1 melts at 320° C.) the substances are not sweated out when moulding the compositions at conventional temperatures, so that even surfaces are obtained. The use of the triazine compounds of the invention with perchloropentacyclodecane has the advantage that by adjusting the amount used the melting point of the mixture of both compounds may be adjusted to any desired and suitable temperature and to the conditions of processing of the composition. The fire retardant properties may often be improved by the additional use of antimony trioxide. This is of particular importance, since the very good surface leakage strength is almost not impaired by this compound. The amount of antimony trioxide is in general in the range from 25 to 50%, calculated on the weight of the additive according to the invention.

The compounds of the invention may, of course, also be used in combination with other flame retardant components, such as compounds containing halogen and/or phosphorus. Suitable compounds are tris-(β-chloroethyl)-phosphate, tris-(dichloropropyl)-phosphate, tris-2,3-(dibromopropyl)-phosphate, halogenated diphenyl derivatives such as trichlorodiphenyl, tetrabromodiphenyl or pentabromodiphenyl. Of course, there should only be used compounds which do not impair the polymerisation. The compounds of the invention may also be added to halogen-containing unsaturated polyesters, thus improving the flame-resistance and generally also raising the halogen-content.

The afore-mentioned compounds (I) are obtained by reacting derivatives of hexahydrotriazine of the formula

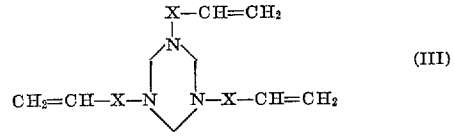

(III)

in which X has the meaning indicated above with at least one mol of hexahalocyclopentadiene the halogen of which having an atomic weight of at least 35 and at most 80. This reaction should occur at a temperature in the range from 80 to 250° C. in an inert solvent, preferably in the presence of a polymerisation inhibitor. Suitable hexahalocyclopentadienes are for example hexabromocyclopentadiene and dibromotetrachlorocyclopentadiene, but preferably hexachlorocyclopentadiene. Mixtures of the afore-mentioned compounds may also be used. The reaction with at least 3 mols and preferably not more than 4 mols of hexahalocyclopentadiene is preferred so as to produce compounds in which the three radicals R are the group (II) in an optimum yield.

Suitably a solution of the reactants in an inert organic solvent is heated in the presence of a polymerisation inhibitor, if desired under super-atmospheric pressure, preferably to a temperature in the range from 90 to 160° C. Suitable solvents are for example aliphatic hydrocarbons, ethers, ketones, esters, aliphatic alcohols, aromatic hydrocarbons and halogenated aromatic or aliphatic hydrocarbons such as white spirit, n-propanol, iso-butanol, toluene, xylene, mono- and dichlorobenzene, 1-chlorodecane. The hexahydrotriazine derivatives separate at the end of the reaction in crystalline form or may be separated in crystalline form by adding for example petrol ether after having the solvent distilled off depending on the solvent used in the reaction. A conventional amount of polymerisation inhibitor is used, e.g. 0.005 to 0.3%, calculated on the weight of the reactants. Suitable compounds are for example hydroquinone, mono- and di-tert.-butyl-hydroquinone, tert.-butyl-pyrocatechol.

The compound of the Formula I, in which all radicals R represent the group (II) and Hal stands for chlorine, contains 59.8% of chlorine and has a melting point of 319 to 320° C. Therefore, this compound is particularly suitable as a fire retardant additive to moulding compositions based on unsaturated polycondensation products such as polyesters and/or polyether acetals. Due to its high chlorine content the fire retardant properties of the moulding composition are considerably improved. Moreover the said compound is not exuded on hardening so that it remains in the moulded article in a homogeneous distribution.

The compound of the Formula I, in which only two of the radicals R represent the group (II) and Hal chlorine, has a slightly smaller chlorine content of 53%. Under the hardening conditions, however, this compound may be copolymerised by its double bond to the polymerisable double bonds of the polycondensation product and the monomer.

Conventional polyether acetals and/or preferably unsaturated polyesters and vinyl monomers can be used together with the compounds of the invention in the manufacture of the moulding compositions. For example, vinyl monomers such as styrene, diallylphthalate or esters of acrylic or methacrylic acid may be used as may also conventional polymerisation catalysts effective at elevated temperatures, e.g. those active above 65° C. Suitable polyether acetals are for example obtained by adding esters containing polymerisable double bonds and alcoholic hydroxy groups to diallylidene pentaerythritol or by trans-esterification of two mols of 2-vinyl-5-alkyl-5-hydroxymethyl-1,3-dioxolane with dialkyl esters of dicarboxylic acids and are for example described in British patent specifications 941,423 and 941,424 and in French patent specification 1,384,676 corresponding to British patent specification 1,000,329.

Mixing may also be effected in a conventional manner. The composition can be prepared in any form, e.g. granules, long glass fibre compositions, cements or prepregs. The compounds of the invention may, if desired, also be worked into compositions suitable for the preparation of the heat-curable fire-retardant moulding compositions of the invention by mixing the additive with (a) the polyesters and/or polyether acetals, (b) the polyesters and/or polyether acetals and monomers or (c) the fillers, particularly powdery fillers. The moulding materials generally also contain a lubricant such as zinc stearate. As fillers which term is indeed to include reinforcing materials, there may be mentioned textile fibres, glass fibres or powdery substances, especially those of a mineral nature.

The examination of the flame resistance may be carried out according to conventional methods. A test sample is contacted for not more than 3 minutes with a 950° C. hot ignition stick and the product from the loss of weight and spreading out of the flame is formed (cf. examination definitions of the Verein deutscher Elektro-Ingenieure (VDE) 0302/III. 43). Under the indicated conditions the fire-retardant product will quickly extinguish so that the product formed from the loss of weight and spreading out of the flame is rather small. Values of this examination of the glowing resistance of the compositions of Examples 1 to 3 and of compositions analogous to those of Examples 1 to 4 in which the amount of additive has been varied (see below) are contained in columns D and E of the table below. The flame resistance may also be determined as follows: A shaped body is exposed by defined distance during 20 seconds to an electric arc (compositions according and analogous to Examples 1 to 4). After removing the flame the period during which burning of the shaped body continues is determined (in seconds). The results found by this method are contained in column F of the table.

| A | B | C | D | E | F |
|---|---|---|---|---|---|
| Type of moulding composition according to example | Compound | Percent by weight [1] | Glowing resistance Mg.cm. | Degree | Period of further burning (sec.) |
| 1 ......... Granulate | According to example 1 | | 140·0.7 | 4 | Not extinguished. |
| ......do...... | | 1.9 | 120·0.5 | 4 | 12. |
| ......do...... | | 3.8 | 110·0.5 | 4 | 10. |
| ......do...... | | 5.7 | 110·0.5 | 4 | 5. |
| 2 ......... Long glass fibre composition (dry, containing diallyl phthalate). | According to example 1 | | 630·2.5 | 2 | Not extinguished. |
| ......do...... | | 3.3 | 170·0.8 | 3 | Extinguished. |
| ......do...... | | 6.6 | 150·0.8 | 3 | Do. |
| ......do...... | | 8.3 | 110·0.6 | 4 | Do. |
| 3 ......... Long glass fibre composition (wet, containing styrene). | According to example 1 | | 780·2.8 | 2 | Not extinguished. |
| ......do...... | | 2.5 | 320·1.0 | 3 | Extinguished. |
| ......do...... | | 6.2 | 170·0.6 | 3 | Do. |
| ......do...... | | 7.5 | 160·0.6 | 4 | Do. |
| 4 ......... Long glass fibre composition (wet, containing styrene). | According to example 4 | 2.0 | 280·1.4 | 3 | Extinguished. |

[1] Calculated on the sum of resin and monomers.

As is evident from the values the flame resistance of the compositions is materially improved by the compounds of the invention. Even the more combustible long glass fibre types which generally have a glowing resistance of degree 2 only became flame resistant. The surface leakage strength is not decreased.

EXAMPLE 1

250 g. of an unsaturated polyester (produced from 25 mol percent terephthalic acid, 25 mol percent maleic anhydride and 50 mol percent propylene glycol-1,2 according to the melt-condensation process, acid value about 30), 10 grams of a compound of the Formula I in which all three radicals R are the group (III) (i.e. the compound 1,3,5-s-tris-(1,4,5,6,7,7 - hexachlorobicyclo - [2,2,1] - 5-heptene-carboxo-2)-hexahydrotriazine), 4 g. of antimony trioxide, 10 g. of diallyl phthalate, 10 g. of zinc stearate, 8 g. of benzoylperoxide, 208 g. of ground limestone and 500 g. of ground kaolin were mixed in a dry state in an unheated kneader and processed to smooth sheets on heated rollers. The sheets solidified after short storage at room temperature and was ground on a cross-beater mill. The granulate was moulded on a press at 140° C. and a pressure of 140 kg./cm.² for 30 seconds to form plates of the size of 150 x 150 x 3 cm. The surface leakage strength was degree T 5 according to the test of DIN 53 480.

The compound of the Formula I was produced by heating 100 g. of 1,3,5-s-tris-acryloyl-hexahydrotriazine (0.4 mol) and 327.6 g. of hexachlorocyclopentadiene (1.2 mols) in 800 g. of xylene in the presence of 0.2 g. of hydroquinone to 130 to 140° C. for four hours while stirring and producing carbon dioxide. A clear solution was obtained which was freed from solvent in vacuo. The yellowish viscous residue was crystallized by adding 500 ml. of petrol ether. 318 g. of crystalline colourless product melting at 315 to 318° C. were obtained, corresponding to 74.4% of the theory. The compound melted at 319 to 320° C. after recrystallisation from acetic acid ethyl ester.

EXAMPLE 2

250 g. of an unsaturated polyester (produced from 20 mol percent of phthalic anhydride, 30 mol percent of maleic anhydride and 50 mol percent of propylene glycol-1,2 according to the melt-condensation process, acid value about 35) were mixed with 50 g. of diallyl phthalate, 25 g. of the hexahydrotriazine derivative recited in Example 1, 8 g. of antimony trioxide, 10 g. of zinc stearate, 10 g. of tertiary butyl perbenzoate, 20 g. of magnesium oxide and 332 g. of ground limestone in a mixer heated to 80° C., until a paste of low viscosity was formed and 300 g. of glass fibres treated with silanes were then added. The mixture was homogenized, removed from the kneader and allowed to cool. The voluminous ductile composition was moulded on a press at 160° C. and 100 kg./cm.² for 1 minute to form a base of a switch, the surface leakage strength of which was degree T 5 according to the test of DIN 53 480.

EXAMPLE 3

400 g. of a styrene-containing unsaturated polyester (produced in two stages according to the process of British patent 968,910 from 20 mol percent of phthalic anhydride, 30 mol percent of maleic anhydride, 50 mol percent of propylene glycol-1,2 and 20 g. of dicyclopentadiene per mol of acid, acid value about 25, styrene content about 35%) were mixed in an unheated mixer with 30 g. of the hexahydrotriazine derivative mentioned in Example 1, 12 g. of antimony trioxide, 10 g. of tertiary butyl perbenzoate, 10 g. of zinc stearate, 30 g. of magnesium oxide and 208 g. of ground limestone until a paste was formed. 300 g. of volanized staple glass fibre was then added to the composition. Mixing was continued until the fibre was evenly and well wetted and the composition was then stored in closed containers for some days at room temperature. Then switch boxes were prepared (moulding conditions: 3 minutes at 150° C. and 200 kg./cm.²).

EXAMPLE 4

400 g. of a styrene-containing unsaturated polyester (produced from 20 mol percent of phthalic anhydride, 30 mol percent of maleic anhydride and 50 mol percent of propylene glycol-1,2, acid value 28, styrene content 32%) were processed with 22 g. of 1,3,5-s-1-acryloyl-3,5 - bis - (1,4,5,6,7,7 - hexachlorodicyclo - [2,2,1] - 5-heptene-carboxo-2)-hexahydrotriazine (IV), 12 g. of antimony trioxide, 5 g. of tertiary butyl perbenzoate, 5 g. of benzoyl peroxide, 15 g. of zinc stearate, 30 g. of magnesium oxide, 95 g. of ground limestone and 160 g. of kaolin to a long glass fibre composition according to the method of Example 3. Shaped bodies produced therefrom had a surface leakage strength of degree T 5 according to the test of DIN 53 480.

Compound (IV) was produced by reacting 25 g. of 1,3,5-s-tris-acryloyl-hexahydrotriazine with 54.6 g. of hexachlorocyclopentadiene in 200 ml. of xylene in the presence of 0.1 g. of monotertiary butyl hydroquinone during four hours at 135 to 140° C. while stirring. After cooling down a clear yellow solution was obtained from which the solvent was distilled off in vacuo. A yellow, highly viscous oil was obtained as a residue to which 200 ml. of petrol ether were added and which mixture was then allowed to stand over night at room temperature. The product solidified to a colourless crystallized substance which was suction filtered and washed with 50 ml. of petrol ether. The yield was 75 g. (corresponding to 95.6% of the theory). The product melted at 202 to 204° C. and had the Formula I in which two of the radicals R are the group (II).

What I claim is:

1. A hexahydrotriazine derivative of the formula

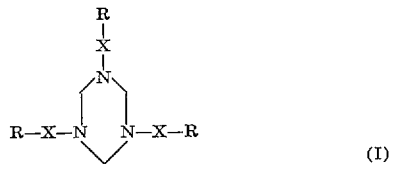

in which X is >C=O or >SO₂ and at least one of the radicals R is the group

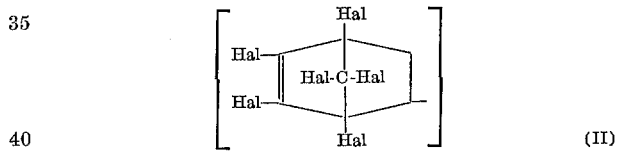

Hal being a halogen having an atomic weight of at least 35 and at most 80 and the other radicals R being the group —CH=CH₂.

2. A compound as claimed in claim 1, wherein at least two of the radicals R represent the group (II).

3. A compound as claimed in claim 2, wherein the halogen is chlorine.

References Cited

UNITED STATES PATENTS

| | | | |
|---|---|---|---|
| 2,910,467 | 10/1959 | Wimmer | 260—248 XR |
| 3,178,430 | 4/1965 | Thatcher | 260—248 |
| 3,361,847 | 1/1968 | Zimmermann et al. | 260—248 XR |
| 3,409,617 | 11/1968 | Wolf et al. | 260—248 |

FOREIGN PATENTS 1,178,071  9/1964  Germany.

JOHN D. RANDOLPH, Primary Examiner

J. M. FORD, Assistant Examiner

U.S. Cl. X.R.

252—8.1; 260—22, 23, 40, 45.8, 861, 863, 864, 868, 869